(12) United States Patent
Wehrs et al.

(10) Patent No.: US 7,458,280 B2
(45) Date of Patent: Dec. 2, 2008

(54) WET GAS INDICATION USING A PROCESS FLUID DIFFERENTIAL PRESSURE TRANSMITTER

(75) Inventors: David L. Wehrs, Eden Prairie, MN (US); Russell N. Evans, Louisville, CO (US); Ghidewon Arefe, Coon Rapids, MN (US)

(73) Assignee: Rosemount Inc., Eden Prairie, MN (US)

( * ) Notice: Subject to any disclaimer, the term of this patent is extended or adjusted under 35 U.S.C. 154(b) by 79 days.

(21) Appl. No.: 11/654,893

(22) Filed: Jan. 18, 2007

(65) Prior Publication Data

US 2007/0163362 A1 Jul. 19, 2007

Related U.S. Application Data

(60) Provisional application No. 60/759,767, filed on Jan. 18, 2006.

(51) Int. Cl.
*G01F 1/34* (2006.01)

(52) U.S. Cl. .................................... 73/861.42

(58) Field of Classification Search .............. 73/756, 73/718, 724, 708, 861.42, 861.52
See application file for complete search history.

(56) References Cited

U.S. PATENT DOCUMENTS

| 5,051,922 A | | 9/1991 | Toral et al. .............. 364/510 |
| 5,969,266 A | * | 10/1999 | Mahoney et al. ......... 73/861.65 |
| 6,151,557 A | | 11/2000 | Broden et al. ............... 702/47 |
| 6,470,755 B1 | * | 10/2002 | Beachey et al. .............. 73/756 |
| 6,961,624 B2 | | 11/2005 | Kirkpatrick et al. ........... 700/19 |
| 7,258,024 B2 | * | 8/2007 | Dimarco et al. .......... 73/861.22 |
| 7,293,471 B2 | | 11/2007 | Lund Bø et al. ......... 73/861.52 |
| 2006/0277000 A1 | | 8/2006 | Wehrs |

FOREIGN PATENT DOCUMENTS

| GB | 2 221 042 | 1/1990 |
| GB | 2 411 476 | 8/2005 |
| WO | WO 99/10712 | 3/1999 |
| WO | WO 02/08702 | 1/2002 |

OTHER PUBLICATIONS

Rosemount: "Rosemount Durchflussmessgerate mit Kompaktmessblende" Emerson Process Managment, Apr. 2005, http://www.emersonprocess.com/rosemount/document/pds/00813-0105-4810.pdf.

The International Search Report and Written Opinion in foreign application No. PCT/US2007/001405 filed Jan. 18, 2007.

(Continued)

*Primary Examiner*—Jewel V Thompson
(74) *Attorney, Agent, or Firm*—Christopher R. Christenson; Westman, Champlin & Kelly, P.A.

(57) ABSTRACT

A process pressure fluid transmitter is coupled to a differential pressure producer and measures a differential pressure across the producer. A statistical parameter is calculated upon successive differential pressure indications, and the calculated parameter is used to indicate wet gas flow. The indication can be generated locally at the process pressure transmitter, communicated via a wired process communication loop, communicated wirelessly, or any combination thereof.

22 Claims, 8 Drawing Sheets

OTHER PUBLICATIONS

"Rosemount Conditioning Orifice Plate in 'Wet,'" Rosemount Inc., 2005.

An official Search Report and Written Opinion from foreign application No PCT/US2007/003747 filed Feb. 14, 2007.

Geng et al., "Study of metering characteristics of a slotted orifice for wet gas flow," Flow Measurement and Instrumentation, vol. 17 (2006), p. 123-128.

H. Toral, S. Cai, R. Steven, and R. Peters, "Characterization of the turbulence properties of wet gas flow in a V-Cone meter with neural nets," 22nd North Sea Flow Measurement Workshop, 2004.

"Handbook of Multiphase Flow Metering," NFOGM/Tekna, Revision 2, Mar. 2005.

Rosemount, "Reference Manual - Rosemount 3095 MultiVariable Mass flow Transmitter with Hart or Foundation Fieldbus Protocol," Emerson Process Management, May 2005.

Rosemount, "Wet Gas Flow Measurement with Conditioning Orifice Meter Flow Test Data Book and Flow Handbook," Reference Manual 00821-0200-4810, Rev AA, Feb. 2006.

Rosemount, "Rosemount 3095 MV MultiVariable Mass Flow Transmitter," Aug. 2004.

Rosemount, "Rosemount Compact Orifice Flowmeter Series," Oct. 2004, p. 13 and 15-22.

* cited by examiner

WET GAS INDICATION USING A PROCESS FLUID DIFFERENTIAL PRESSURE TRANSMITTER

CROSS-REFERENCE TO RELATED APPLICATION

The present application is based on and claims the benefit of U.S. provisional patent application Ser. No. 60/759,767, filed Jan. 18, 2006, the content of which is hereby incorporated by reference in its entirety.

BACKGROUND OF THE INVENTION

In many process installations, a process fluid flows through a conduit, such as process piping. The process fluid may be a liquid, a gas, or a combination of the two. In applications where the process fluid is completely liquid, or completely gas, the calculation of flow parameters, such as mass flow is relatively straightforward. However, in applications where the process fluid is a combination of a liquid and a gas, the calculation of flow parameters is more difficult. Examples of process fluids that generally have a liquid intermingled with a gas (e.g. multiphasic) include wet steam, and natural gas.

In many natural gas well head applications, there is a substantial amount of liquid entrained in the gas stream. The presence of this liquid can cause significant errors in the gas flow measurement. One type of error is sometimes called overreading. Overreading occurs when the differential pressure sensor overreads the true gas flow by a value relating the total gas mass flow to the total liquid mass flow. This is sometimes called the Lockhart Martinelli parameter. While it may be possible to measure many parameters, and utilize powerful processors to compute flow parameters, such calculations have typically involved dedicated hardware, dedicated technician time and/or testing, or a combination of the two.

Process fluid control installations generally employ process variable transmitters, such as process pressure transmitters. Providing such a process pressure transmitter with the ability to provide an indication relative to wet gas, without adding additional hardware, or involving complex initial characterization or calibration of the device would represent a significant benefit.

SUMMARY OF THE INVENTION

A process pressure fluid transmitter is coupled to a differential pressure producer and measures a differential pressure across the producer. A statistical parameter is calculated upon successive differential pressure indications, and the calculated parameter is used to indicate wet gas flow. The indication can be generated locally at the process pressure transmitter, communicated through a wired process communication loop, communicated wirelessly, or any combination thereof.

DETAILED DESCRIPTION OF ILLUSTRATIVE EMBODIMENTS

Figure 1:
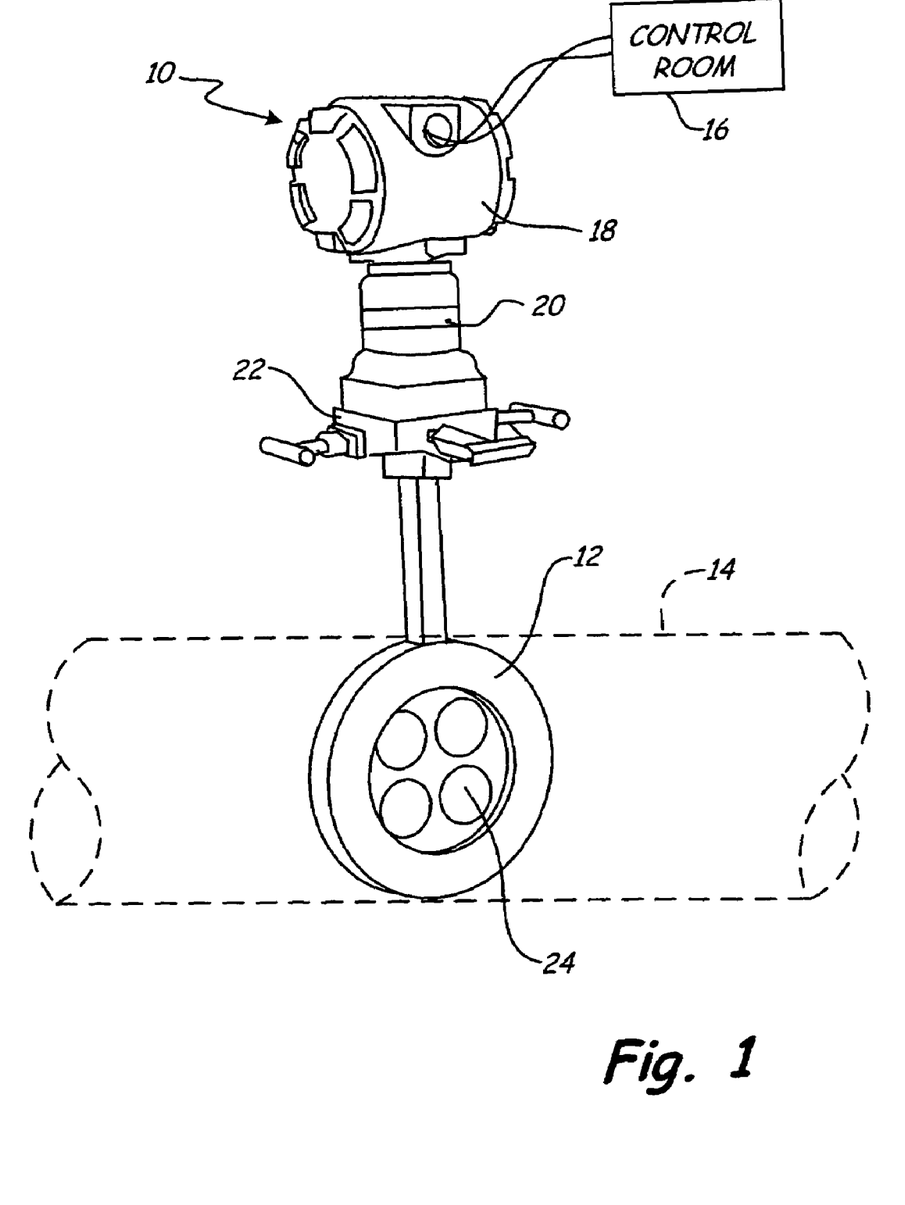
FIG. 1 is a diagrammatic view of a differential pressure transmitter coupled to a differential pressure producer within process fluid piping.

FIG. 1 is a diagrammatic view of a differential pressure transmitter 10 coupled to a differential pressure producer 12 within piping 14. Differential pressure transmitter 10 is operably coupled to control room 16 using any suitable connection, including wired or wireless connections. Examples of suitable wired connections include the Highway Addressable Remote Transducer (HART®) protocol, the FOUNDATION™ Fieldbus Protocol, or other protocols. Additionally, or alternatively, wireless data transmission protocols can also be employed. In some wired embodiments, differential pressure transmitter 10 is able to be wholly powered by energy received through the wired process communication lines through which it communicates.

Pressure transmitter 10 includes electronics compartment 18, coupled to sensor module 20 which is further coupled to manifold 22. Manifold 22 couples sensor module 20 to differential pressure producer 12. Ports on opposite sides of partial obstruction 24, convey both upstream and downstream process fluid pressures to manifold 22. Manifold 22 isolates the process fluid from sensor module 20, but conveys both the upstream and downstream process fluid pressures to a differential pressure sensor disposed within sensor module 20.

Process pressure transmitter 10 is considered a field device in that it is generally able to be mounted in the field. The "field" is generally an external area in a process installation that may be subject to climatological extremes, vibration, changes in humidity, electromagnetic or radio frequency interference, or other environmental challenges. Thus, the robust physical package of process pressure transmitter 10 provides pressure transmitter 10 with the ability to operate in the "field" for extended periods (such as years) at a time.

Figure 2:
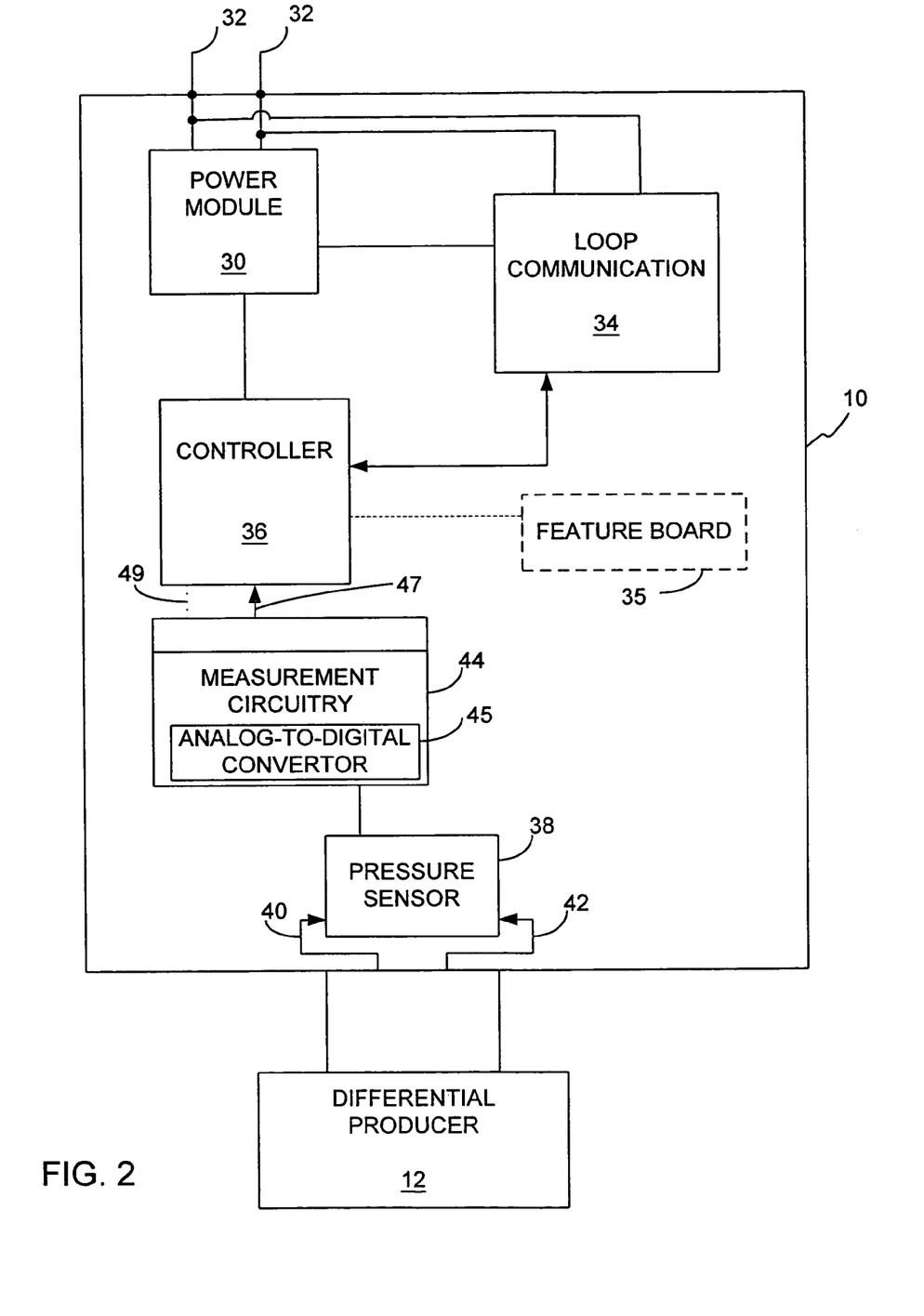
FIG. 2 is a block diagram of differential pressure transmitter in accordance with an embodiment of the present invention.

FIG. 2 is a block diagram of process pressure transmitter 10 in accordance with an embodiment of the present invention. Transmitter 10 includes power module 30 operably coupled to process communication loop 32. Transmitter 10 preferably includes loop communication module 34 which is also operably coupleable to process communication loop 32. Loop communication module 34 is configured to provide signaling in accordance with a particular process industry standard protocol, such as the HART® protocol or FOUNDATION™ Fieldbus Protocol. Pressure transmitter 10 includes controller 36 which preferably includes a low-power microprocessor. Controller 36 receives power from power module 30 and communicates bi-directionally with loop communication module 34. Transmitter 10 may also include feature board 35, as will be described in greater detail below. As illustrated in FIG. 2, differential pressure producer 12 is operably coupled to differential pressure sensor 38 via impulse lines 40 and 42.

In one embodiment, differential pressure sensor 38 generally includes a movable membrane that moves in response to differential pressure within lines 40 and 42. Differential pressure sensor 38 can include a conductive diaphragm that forms a capacitor with respective plates on either side of the diaphragm. Thus, as the conductive diaphragm moves, the capacitance changes and such change can be used to indicate differential pressure. Other forms of differential pressure sensors can also be used for differential pressure sensor 38. Suitable examples include strain gauge-based sensors, piezoresistive-based sensors, or others.

Differential pressure sensor 38 is electrically coupled to measurement circuitry 44 which is configured to measure the changing electrical characteristic of differential pressure sensor 38. Measurement circuitry 44 preferably includes an analog-to-digital converter 45. Analog-to-digital converter 45 is coupled to pressure sensor 38 and provides a digital indication to controller 36 based upon the electrical characteristic of pressure sensor 38. In one embodiment, analog-to-digital converter 45 can be based on sigma-delta converter technology. Each converted digital representation of the differential pressure is provided to controller 36. Sigma-delta converters are often used in the process measurement and control industry due to their fast conversion times, low power consumption and high accuracy.

Sigma-delta converters generally employ an internal capacitor charge pumping scheme that generates a digital bitstream that is analyzed, generally by counting positive 1's over a set interval. For example, one sigma-delta converter currently in use provides a digital bitstream consisting of 50% 1's to indicate the minimum pressure measurement, and 75% 1's to indicate the maximum pressure measurement. The digital values converted by converter 45 are preferably provided to controller 36 along line 47.

In accordance with another embodiment of the present invention, converter 45 can provide the raw digital bitstream to controller 36 along line 49 (illustrated in phantom). This bitstream usually has a frequency that is many orders of magnitude higher than the conversion frequency of converter 45. For example, a sigma-delta converter may provide a digital bitstream that has a frequency of approximately 57 kHz. Accordingly, statistical processing, in accordance with embodiments of the present invention can take different forms. For example, controller 36 may simply store digital values provided on line 47 at the conversion rate of converter 45, which values are then stored in memory (not shown) for later analysis. Accordingly, the rate at which these values are acquired and stored is dictated solely by the conversion rate of converter 45.

For maximum resolution, pressure transmitter 10 can employ converter 45 to store the raw bitstream from line 49 directly into memory. Thus, a sigma-delta converter providing a digital bitstream having a frequency of approximately 57 kHz will provide 57,000 bits to be stored in memory for each second of data capture or processing.

Measurement circuitry 44 provides digital indications with respect to pressure sensor 38 to controller 36. Such digital indications may be completed digitizations of individual analog measurements relative to a capacitance or resistance sensed from pressure sensor 38. Additionally, or alternatively, the digital indications provided from measurement circuitry 44 to controller 36 can include digital bit stream data. Measurement circuitry 44 can also include components or modules to characterize, compensate, linearize, or otherwise groom the measured signal(s).

Rosemount Inc., of Chanhassen, Minn., has developed process instrumentation of modular designs. Thus, differential pressure transmitter 10 can have additional features augmented thereto by the provision of a particular feature board. A feature board, such as feature board 35 (indicated in phantom in FIG. 2), can be mounted within electronics compartment 18 and can provide transmitter 10 with new functionality. In accordance with an embodiment of the present invention, it is expressly contemplated that at least some of the analysis, and alarm generation can be performed in a feature board. Thus, embodiments of the present invention can be practiced by retrofitting legacy process instrumentation with feature boards providing wet gas diagnostics.

Embodiments of the present invention generally stem from the discovery that for multiphase process fluids flowing through a conduit, such as piping 14, the ratio of the standard deviation of the differential pressure sensor signal to the mean of the differential pressure sensor signal remains relatively constant or decreases slightly as flow rate increases. This is true for both gas and liquid flows. However, if the liquid volume fraction (LVF) value increases, the ratio of the standard deviation to the differential pressure mean increases at a significant rate. FIGS. 3-6 illustrate this relationship.

Figure 3:
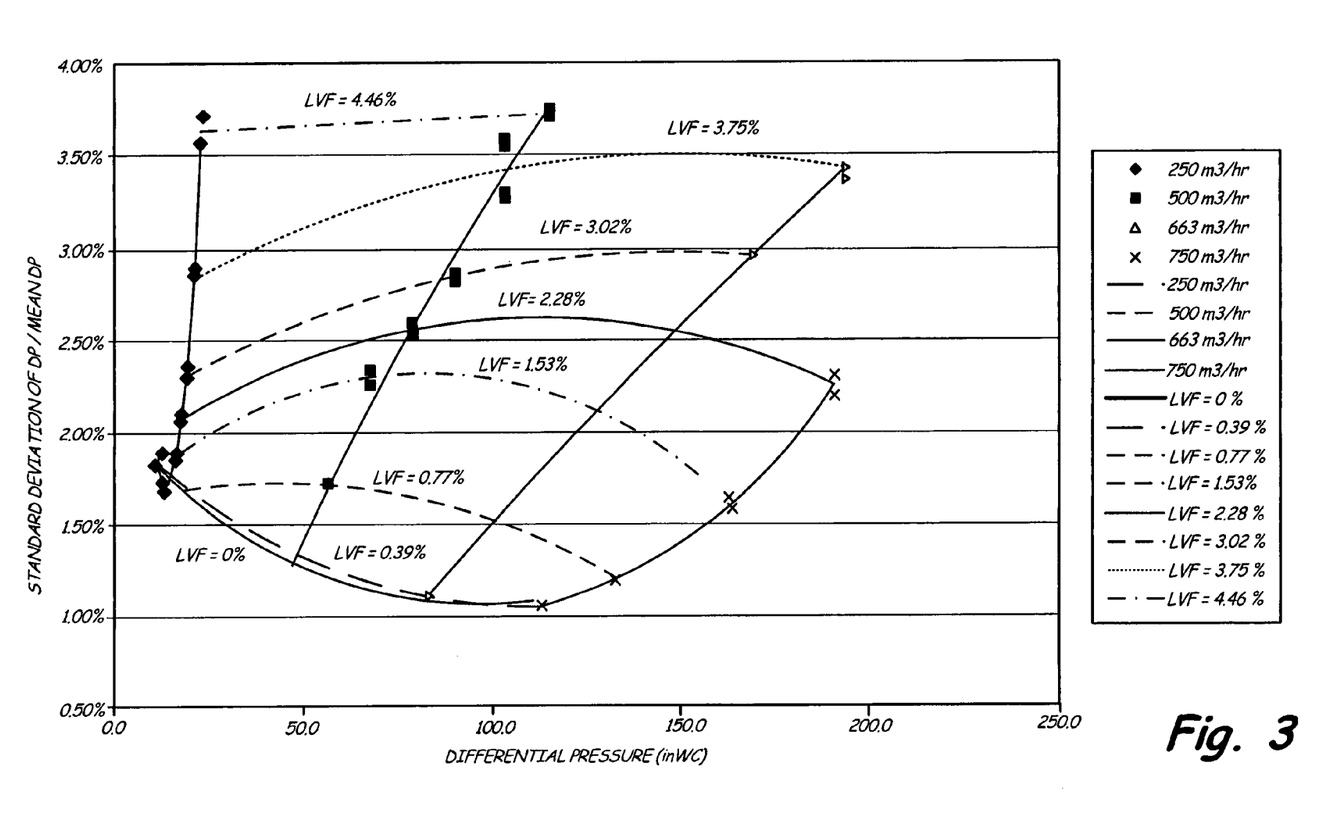
FIG. 3 is a chart indicating the relationship between the ratio of standard deviation to differential pressure mean and the differential pressure value for a 0.75 Beta V-cone at pressure of 15 bars.

FIG. 3 is a chart indicating the relationship between the ratio of standard deviation to differential pressure mean and the differential pressure value for a 0.75 beta differential pressure producer (sold under the trade designation V-Cone, and available from McCrometer, Inc. of Hemet, Calif.) at a pressure of 15 bars. The results indicate that in general, as the gas flow rate at a fixed liquid volume fraction increases, the differential pressure increases as expected for the differential pressure flow square root relationship while the ratio of standard deviation to differential pressure mean remains relatively flat, though a slight increase or decrease may also be experienced. However, if the liquid volume fraction increases, the ratio of standard deviation to differential pressure mean increases at a significant rate. For this primary element at a pressure of 15 bars, the sensitivity (or slope) of the ratio of standard deviation to differential pressure mean to increasing liquid volume fraction is highest at the lowest gas flow rate (250 cubic meters per hour) and is lower at the highest flow rate. However, at the higher flow rates, the ratio of standard deviation to differential pressure mean also generally decreases with higher flow rates. The results also indicate that at liquid volume fractions less than 0.77%, the change in the ratio of standard deviation to differential pressure mean is insignificant. However, low liquid volume fractions will also have a relatively small impact on the over reading value itself.

Figure 4:
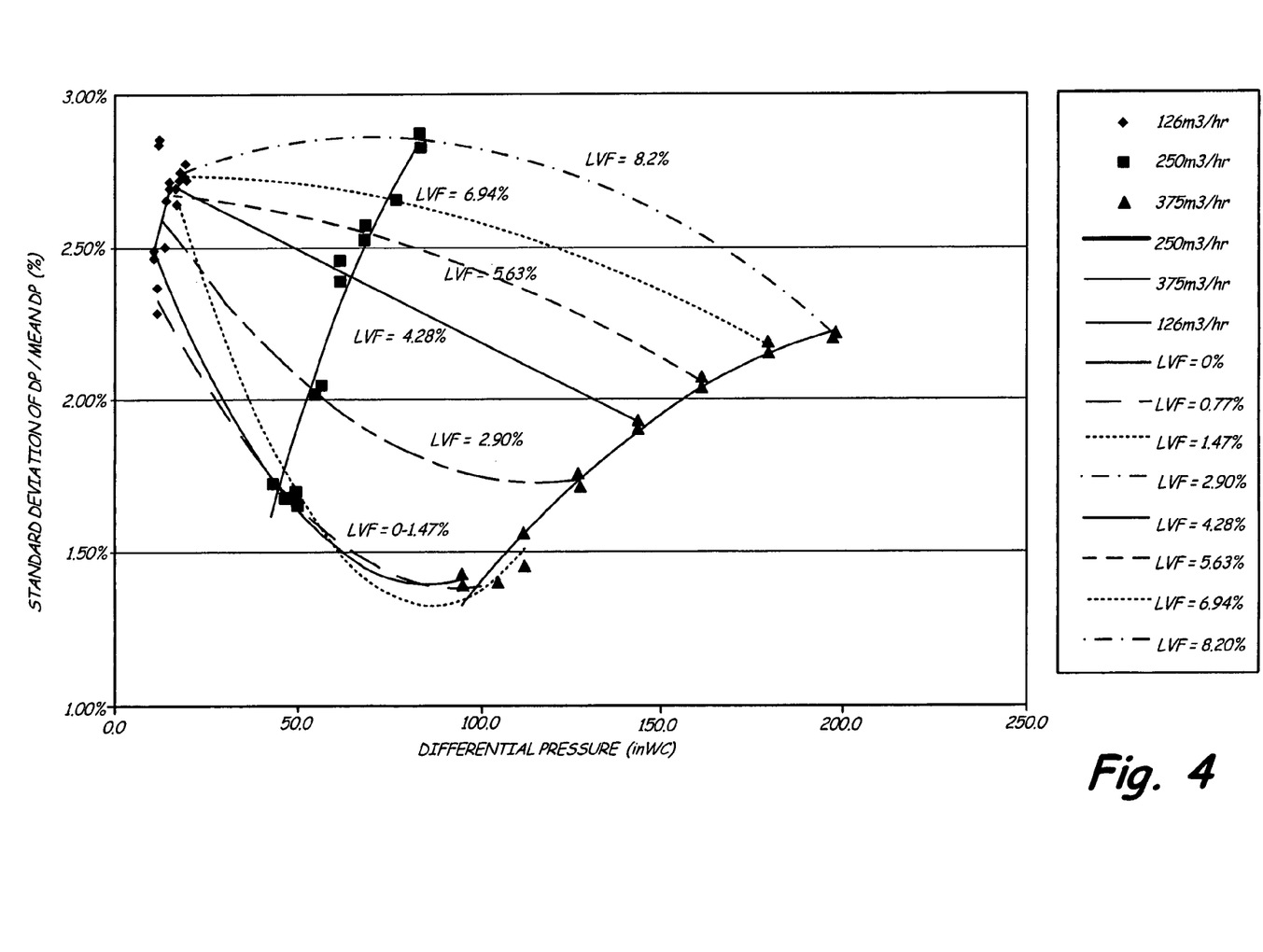
FIG. 4 is a chart showing test results for a v-cone at a pressure of 60 bars.

FIG. 4 is a chart showing test results for the same primary element of FIG. 3, but at a higher pressure: 60 bars. While tested over a wider range of liquid volume fraction values, the ratio of standard deviation to differential pressure mean shows slightly less sensitivity to changing liquid volume fraction. Also, the results for the lowest gas flow rate (125 cubic meters per hour) are not distinguishable from each other. This may be caused by the physical design of the v-cone and the lower gas flow rate. The differential pressure producer's pressure sensing ports are located in the center of the meter, and the signal may not be as disturbed at the low flow rate.

Figure 5:
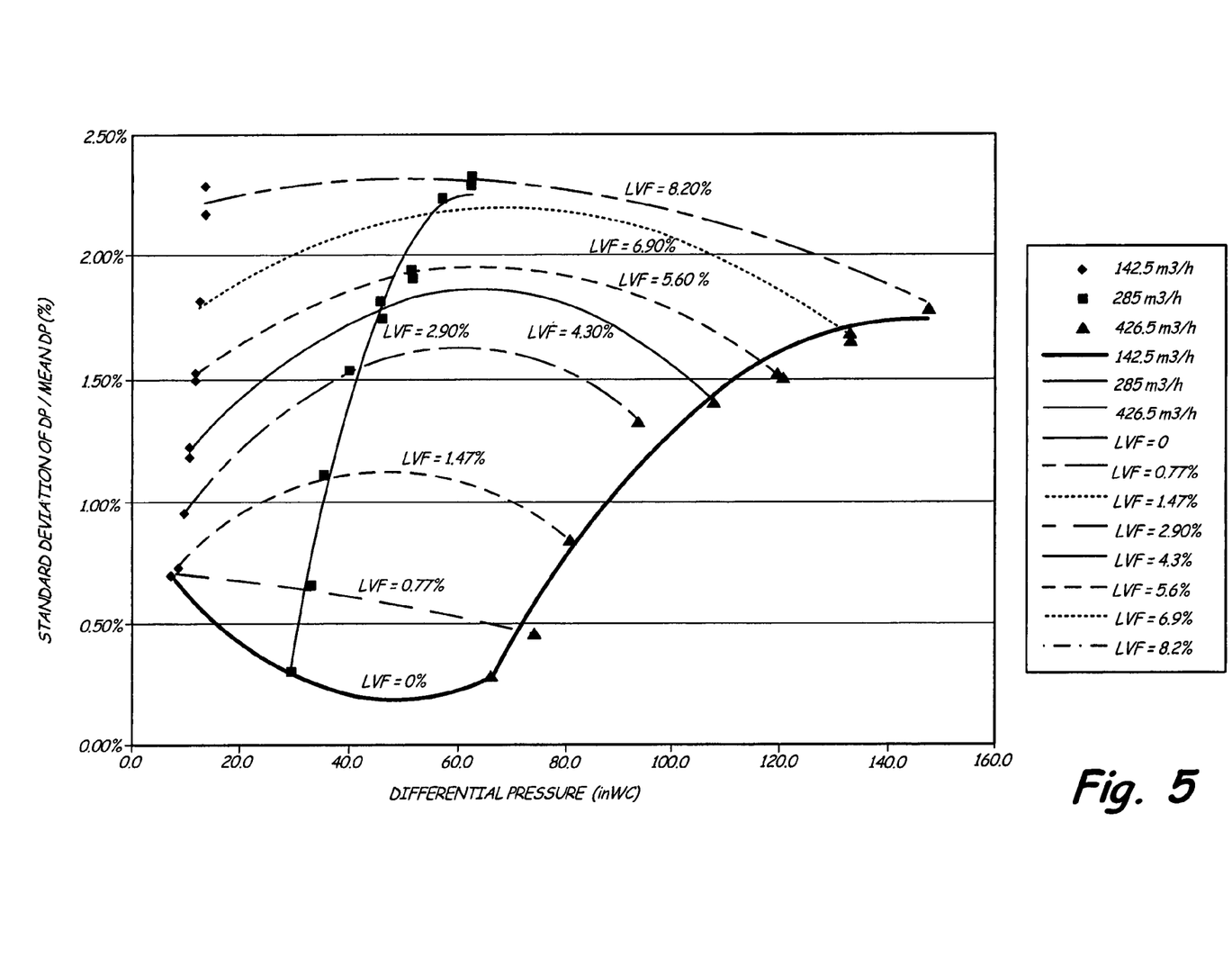
FIG. 5 is a chart showing the results for a 0.75 Beta differential pressure producer at a pressure of 60 bars.

FIG. 5 is a chart showing the results for a different 0.75 Beta venturi differential pressure producer at a pressure of 60 bars. The results are similar to those set forth above in FIG. 4. Excellent sensitivity to the ratio of standard deviation to differential pressure means is indicated at the three gas flow rates tested. Even at the lowest flow rate, once the liquid volume fraction increases above 1.47%, the ratio increases significantly.

Figure 6:
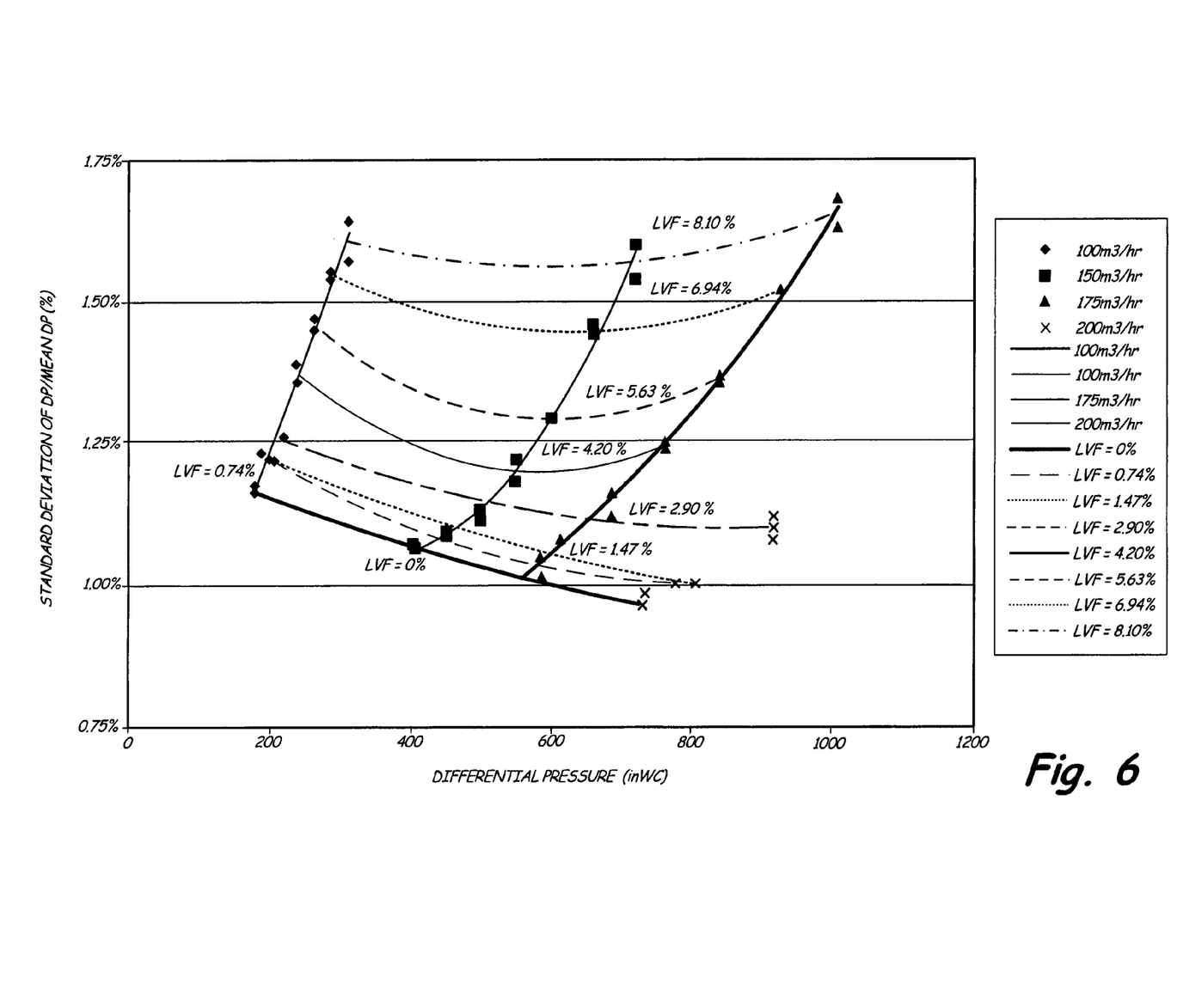
FIG. 6 is a chart illustrating test results for a 0.4 Beta compact orifice-plate.

FIG. 6 is still another chart illustrating test results for a 0.4 Beta compact orifice plate sold under the trade designation 405C available from Rosemount Inc., of Chanhassen, Minn. The compact orifice plate was tested at a pressure 60 bars.

While less sensitive than the other two differential producers, the ratio of standard deviation to differential pressure means displays the same relationship to increasing gas flow rates and increasing liquid volume fractions as the other two devices, particularly above liquid volume fractions of 2.9%.

Figure 7:
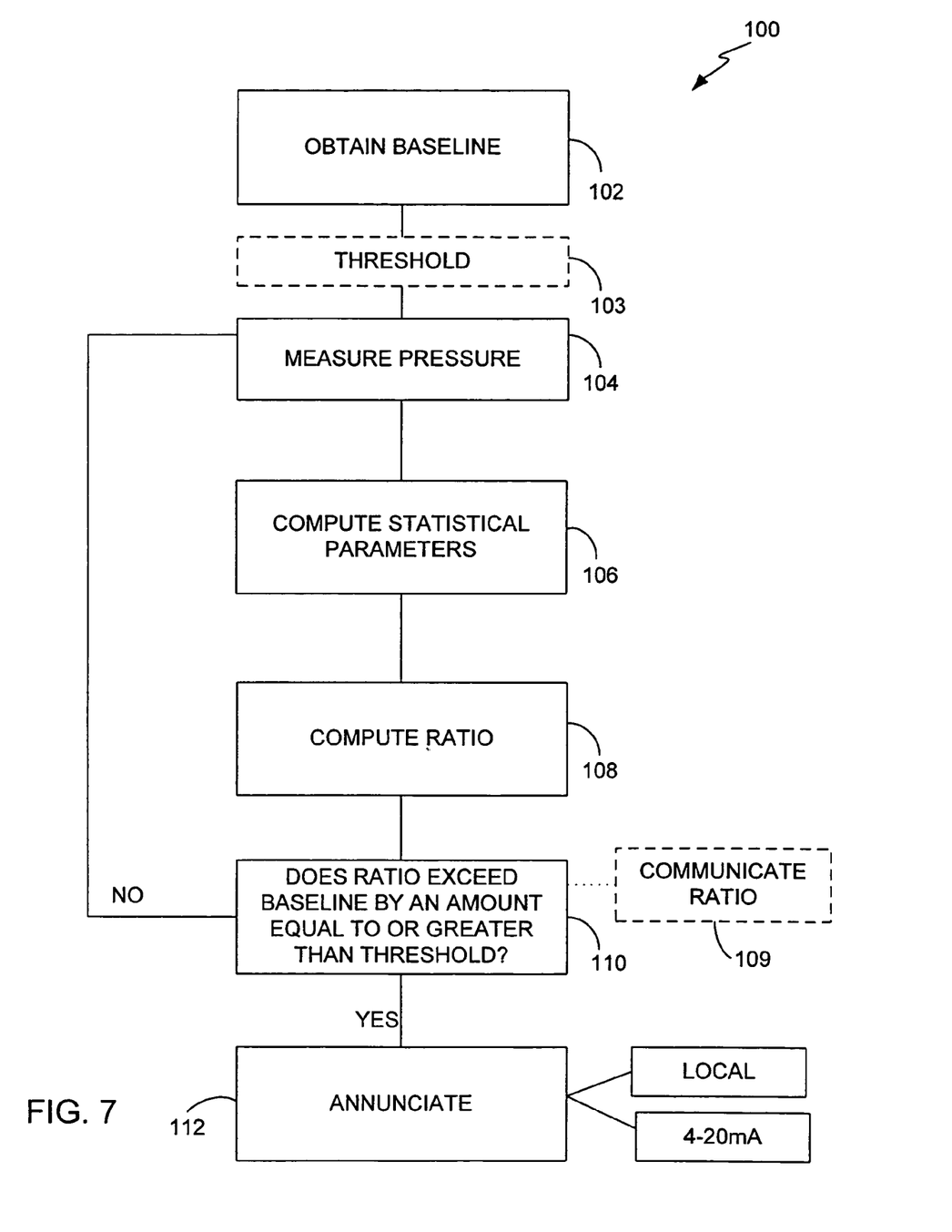
FIG. 7 is a flow diagram of a method for providing wet gas diagnostics in accordance with an embodiment of the present invention.

FIG. 7 is a flow diagram of a method for providing wet gas diagnostics in accordance with an embodiment of the present invention. Method 100 begins at block 102 where a baseline of statistical parameters is created. Creating the baseline is preferably done under control at conditions that are considered to be "normal" for the process. The transmitter calculates the statistical parameters over a set period of time, such as a default of three minutes. Preferably, the period of time used to create the baseline is user selectable. Optionally, a user can set, or otherwise select a threshold, as indicated (in phantom) at block 103. The threshold controls, or otherwise defines, the amount that statistical parameters observed during runtime can deviate from the baseline parameters before an alarm is registered.

At block 104, runtime begins with the measurement of the first runtime differential pressure. At block 106, one or more statistical parameters are calculated based upon the measured pressure. At block 108, the ratio of standard deviation of the differential pressure signal to the mean of the differential pressure is calculated. As indicated at phantom block 109, the diagnostic status and any or all of the statistical parameters can also be communicated to the user through any suitable methods. For example, diagnostic status and/or statistical parameters could be communicated over the process communication loop using, for example, HART® or FOUNDATION™ Fieldbus communication as appropriate. Further, an additional transmitter output, such as a 4-20 mA output could be used to convey the statistical value(s) via a 4-20 mA signal.

At block 110, the runtime statistical parameters, such as the ratio described above, are compared to respective baseline values to determine if they differ from each other by an amount that is equal to, or greater than the threshold. If the values do not differ by such an amount, then control returns to block 104. However, if the values do differ by an amount that is equal to or greater than the threshold, then control passes to block 112 where an annunciation is generated.

Annunciation can include the generation of an alarm displayed locally on the transmitter's display. Additionally, or alternatively, the alarm can be communicated to the control system for annunciation there. Annunciation can include sending a suitable communication along the process communication lines, such as through the HART® or FOUNDATION™ Fieldbus process communication loop, generating an audible or visual alarm locally at the pressure transmitter, sending a wireless communication such as via Wireless Fidelity (WiFi) communication or cellular communication, or any combination thereof. In systems where the control system cannot communicate digitally, a traditional 4-20 mA can be programmed to go to a particular state or value that would not be observed during normal operation. Such a condition would result in the loss of the primary variable from the transmitter, but the change would be clearly communicated.

Embodiments of the present invention generally provide process differential pressure transmitters with the ability to quickly and easily provide wet gas indications.

Figure 8:
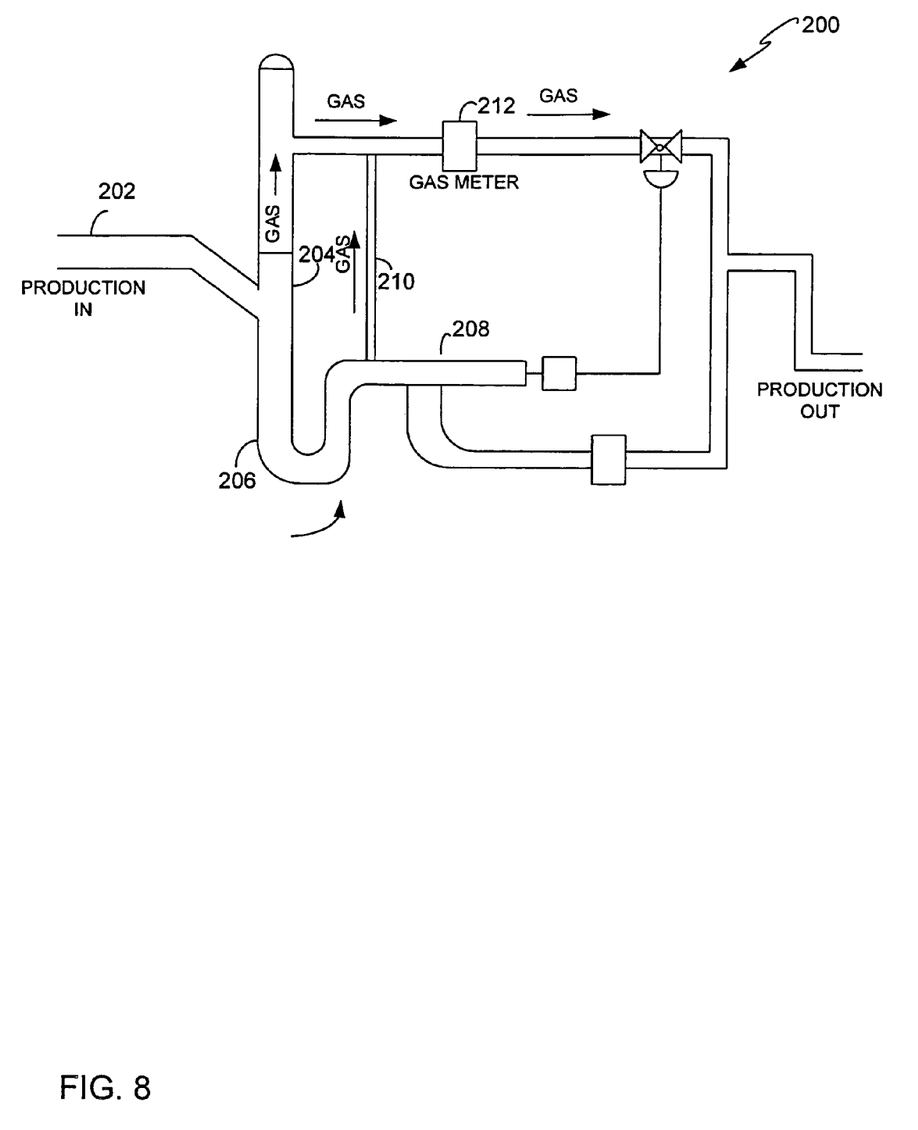
FIG. 8 is a diagrammatic view of a multiphasic fluid separator in accordance with an embodiment of the present invention.

In accordance with one embodiment of the present invention, such a differential pressure transmitter can be implemented within a multiphasic fluid separator. FIG. 8 is a diagrammatic view of such a separator. Separator 200 includes production fluid inlet 202 which conveys production fluid to vertical stack 204. A first separation between gas and liquid occurs in vertical stack 204, with liquid, and some gas entrained therein, descending, by virtue of gravity, into bend 206. Such liquid, and entrained gas then passes into horizontal section 208 for further separation. Within horizontal section 208, the gas that was entrained flows through gas conduit 210 to rejoin gas that was originally separated in vertical stack 204. Such gas then flows into gas meter 212. If the well(s) feeding separator 200 are producing at a rate that is too high, the velocity of the fluid entering vertical separator 204 may be too high as well. As a result, some liquid will be carried along with the gas causing an overreading condition in gas meter 212. Placing a differential pressure transmitter within separator 200 as gas meter 212, allows the user or system to be alerted to an increase in the liquid content flowing proximate gas meter 212. The user could then adjust the separator operation accordingly, or halt operation altogether to prevent damage.

Another exemplary application for embodiments of the present invention is in the flow measurement on the outlet of a well head. For example, the transmitter could be installed on the outlet of a well head prior to a separator. Once the well is drilled and producing, the fluid stream would be sent to a test separator to determine the fluid components and to establish an overreading correction. The well would then be put into production. A user could elect for custody transfer or accounting purposes to periodically reconnect to the test separator to check the values. A diagnostic, in accordance with embodiments of the present invention, is useful to provide the user with an indication when the liquid volume fraction changes, so that the test separator is only used when necessary. This avoids the cost of connecting the test separator and the loss of production time during this period.

Embodiments of the present invention are generally applicable to any multiphasic process fluid flow installations. For example, superheated or saturated steam generally has no liquid component. However, if the operation of the boiler is below par, or there is a problem with transportation piping, some of the steam may condense and form wet steam. Wet steam is undesirable because of the energy loss. Moreover, the liquid can cause erosion problems with piping, valves, and the differential pressure producers themselves. Thus, an indication of wet steam would also be of significant value to district heating producers, power plants, and steam produced for internal purposes of a paper mill, refinery or similar industrial facility. Such an indication of wet steam could be used to direct an operator of the process to adjust the operation of the system to eliminate or reduce the presence of wet steam in the process. Additionally, the operator can be directed to perform testing relative to the wet steam.

Although the present invention has been described with reference to preferred embodiments, workers skilled in the art will recognize that changes may be made in form and detail without departing from the spirit and scope of the invention.

What is claimed is:

1. A process fluid pressure transmitter for providing an indication of a change in liquid volume fraction in a multiphasic process fluid flow, the pressure transmitter comprising:

a differential pressure sensor operably coupleable to a differential pressure generator within a process fluid flow conduit;

measurement circuitry coupled to the differential pressure sensor to provide successive indications relative to an electrical characteristic of the differential pressure sensor; and a controller operably coupled to the measurement circuitry, the controller being configured to calculate a parameter based upon the successive indications relative to the electrical characteristic, and to selectively provide an indication of a change in liquid volume fraction within the multiphasic process fluid flow based upon the parameter.

2. The process fluid pressure transmitter of claim 1, and further comprising a power module operably coupleable to a process communication loop, the power module being configured to wholly power the process fluid pressure transmitter with electrical energy received from the loop.

3. The process fluid pressure transmitter of claim 2, and further comprising loop communication circuitry operably coupleable to the process communication loop, and wherein the indication of a change in liquid volume fraction is transmitted through the process communication loop.

4. The process fluid pressure transmitter of claim 1, and further comprising loop communication circuitry operably coupleable to the process communication loop, and wherein the indication of a change in liquid volume fraction is transmitted through the process communication loop.

5. The process fluid pressure transmitter of claim 1, wherein the successive indications relative to an electrical characteristic of the differential pressure sensor are digitizations of a capacitance of the differential pressure sensor.

6. The process fluid pressure transmitter of claim 5, wherein the digitizations are provided at a rate in excess of 20 times per second.

7. The process fluid pressure transmitter of claim 1, wherein the successive indications relative to an electrical characteristic of the differential pressure sensor comprises a digital bitstream flowing from the measurement circuitry to the controller.

8. The process fluid pressure transmitter of claim 7, wherein the digital bitstream flow at a rate in excess of 50 kHz.

9. The process fluid pressure transmitter of claim 1, wherein the parameter calculated by the controller relative to the successive indications incorporates standard deviation.

10. The process fluid pressure transmitter of claim 9, wherein the parameter calculated by the controller relative to the successive indications incorporates the mean of the differential pressure.

11. The process fluid pressure transmitter of claim 10, wherein the parameter incorporates a ratio of the standard deviation of the differential pressure signal to the mean of the differential pressure signal.

12. The process fluid pressure transmitter of claim 11, wherein the controller selectively provides an indication of a change in liquid volume fraction based upon a comparison between the ratio of the standard deviation to the differential pressure mean and a stored ratio of a previous standard deviation to a previous differential pressure mean.

13. The process fluid pressure transmitter of claim 12, wherein the indication of a change in liquid volume fraction is generated if the difference between the two ratios exceeds a selected threshold.

14. The process fluid pressure transmitter of claim 1, wherein the controller is embodied on a feature board.

15. The process fluid pressure transmitter of claim 1, wherein the indication of the change in liquid volume fraction is provided as an alert via a process communication loop to direct an operator to perform a test relative to the multiphasic process fluid.

16. The process fluid pressure transmitter of claim 1, wherein the indication of the change in liquid volume fraction is provided as an alert via a process communication loop to direct an operator to adjust an operation relative to the multiphasic process fluid.

17. A method of diagnosing a change in liquid volume fraction of a multiphasic process fluid, the method comprising:
    obtaining a baseline statistical parameter with respect to differential pressure across a differential pressure generator disposed in the process fluid operating at a normal condition;
    measuring a plurality of successive differential pressures;
    computing, using circuitry disposed within a differential pressure transmitter, a statistical parameter of the plurality of successive differential pressures; and
    selectively generating an indication of liquid volume fraction change based upon a comparison of the computed statistical parameter with the baseline statistical parameter.

18. The method of claim 17, wherein the multiphasic process fluid includes natural gas.

19. The method of claim 17, wherein the multiphasic process fluid includes steam.

20. The method of claim 17, and further comprising wholly powering the differential pressure transmitter with power received from a process communication loop.

21. The method of claim 17, wherein the statistical parameter includes standard deviation.

22. The method of claim 17, wherein the statistical parameter includes a ratio of the standard deviation of successively measured differential pressures to a mean of the successively measured differential pressures.

* * * * *

UNITED STATES PATENT AND TRADEMARK OFFICE
CERTIFICATE OF CORRECTION

| | |
|---|---|
| PATENT NO. | : 7,458,280 B2 |
| APPLICATION NO. | : 11/654893 |
| DATED | : December 2, 2008 |
| INVENTOR(S) | : Wehrs et al. |

It is certified that error appears in the above-identified patent and that said Letters Patent is hereby corrected as shown below:

Col. 1, On Page 2, Line 1 please delete under Other Publications ""Rosemount Conditioning Orifice Plate in 'Wet,'" Rosemount Inc., 2005." and insert --"Rosemount Conditioning Orifice Plate in 'Wet Gas,'" Rosemount Inc., 2005.--

Signed and Sealed this

Twentieth Day of January, 2009

JON W. DUDAS
*Director of the United States Patent and Trademark Office*